(12) United States Patent  
Habermann

(10) Patent No.: US 7,645,040 B2  
(45) Date of Patent: *Jan. 12, 2010

(54) GLASSES

(75) Inventor: Gert Habermann, Munich (DE)

(73) Assignee: ic! Berlin brillenproduktions GmbH, Berlin (DE)

(*) Notice: Subject to any disclaimer, the term of this patent is extended or adjusted under 35 U.S.C. 154(b) by 56 days.

This patent is subject to a terminal disclaimer.

(21) Appl. No.: 11/559,071

(22) Filed: Nov. 13, 2006

(65) Prior Publication Data

US 2007/0121062 A1    May 31, 2007

Related U.S. Application Data

(63) Continuation of application No. PCT/DE2005/000881, filed on May 13, 2005, and a continuation of application No. 11/125,793, filed on May 10, 2005, now Pat. No. 7,344,242.

(30) Foreign Application Priority Data

May 13, 2004    (DE)  ............... 10 2004 023 839

(51) Int. Cl.  
*G02C 5/22*     (2006.01)  
(52) U.S. Cl. ........................... 351/153; 16/228  
(58) Field of Classification Search ................ 351/153, 351/140, 111, 113, 114, 158, 41; 16/228  
See application file for complete search history.

(56) References Cited

U.S. PATENT DOCUMENTS

| 3,155,982 | A | * | 11/1964 | Baratelli ..................... 2/12 |
| 3,744,887 | A |   | 7/1973  | Dunbar |
| 4,978,209 | A |   | 12/1990 | Ohba |
| 5,315,328 | A | * | 5/1994  | Hofmair et al. ............. 351/121 |
| 5,418,581 | A | * | 5/1995  | Conway ..................... 351/116 |
| 5,532,766 | A |   | 7/1996  | Mateer et al. |
| 6,890,073 | B2 | * | 5/2005  | DiChiara et al. ............. 351/90 |

FOREIGN PATENT DOCUMENTS

| DE | 8902196   | 5/1989  |
| EP | 0863424   | 9/1998  |
| FR | 954467    | 1/1950  |
| FR | 2779241   | 12/1999 |
| GB | 2034072   | 5/1980  |
| WO | WO9848314 | 10/1998 |
| WO | 0067067   | 11/2000 |

* cited by examiner

*Primary Examiner*—Hung X Dang  
(74) *Attorney, Agent, or Firm*—Grossman Tucker Perreault & Pfleger, PLLC

(57) ABSTRACT

The invention relates to a pair of glasses comprising a temple (1) and a connecting element (8) pertaining to a rim (7), both on the left side and the right side of the pair of glasses. The connecting element (8) is provided with joint elements (11, 13) which co-operate with joint elements (6) provided on the rim end of the temple (1), forming a swivel joint. The temple (1) comprises at least two fingers (2, 3) which extend in a longitudinal direction on the rim end thereof, the fingers exerting a spring action in the direction of the articulated axis of the swivel joint.

12 Claims, 4 Drawing Sheets

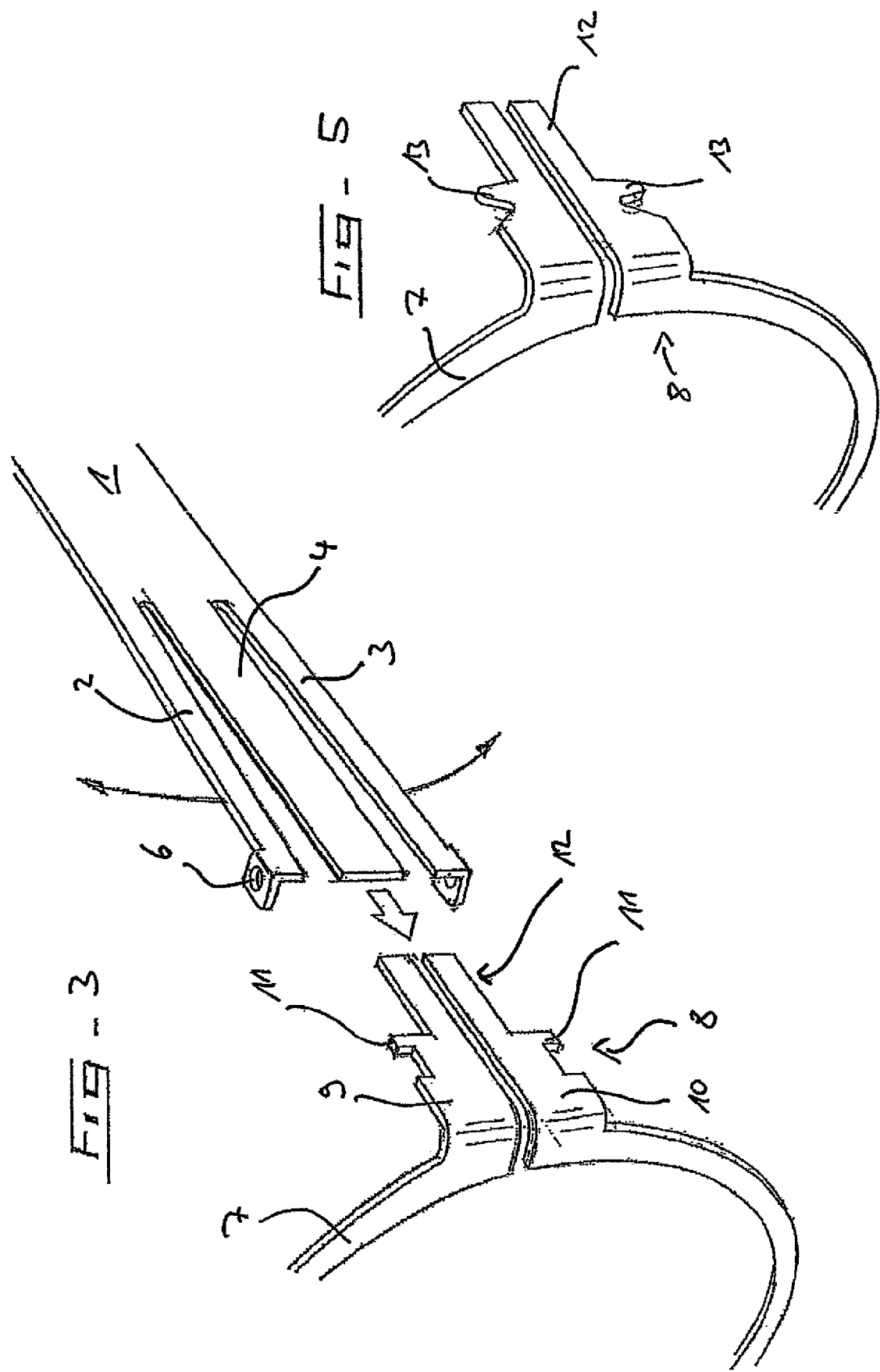

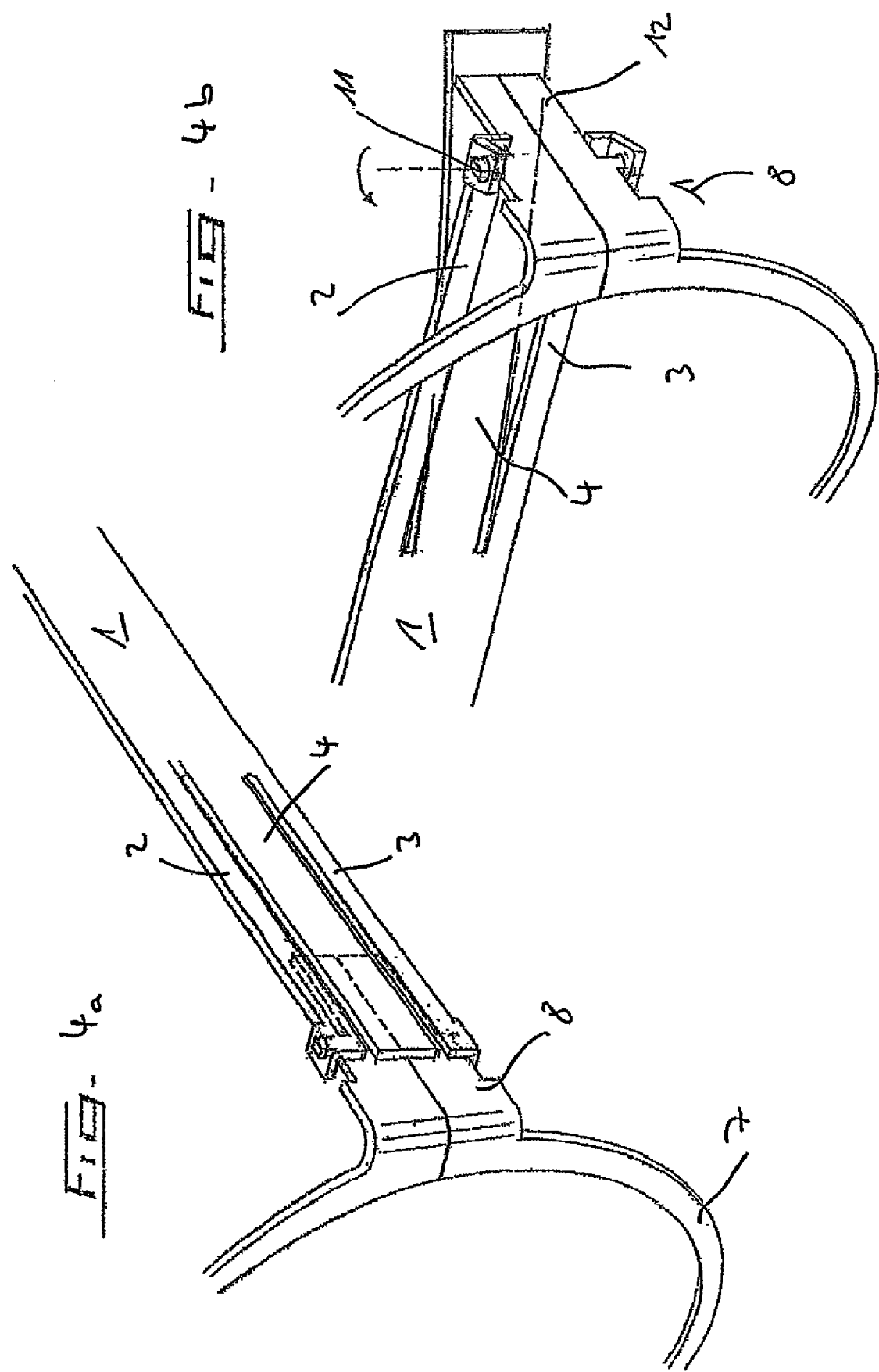

GLASSES

CROSS REFERENCE TO RELATED APPLICATION

This application is a continuation of International Application PCT/DE2005/000881, with an international filing date of May 13, 2005, and is a continuation of U.S. patent application Ser. No. 11/125,793, filed on May 10, 2005, now U.S. Pat. No. 7,344,242 both of which are fully incorporated herein by reference.

TECHNICAL FIELD

The present invention relates to glasses or respectively a glasses frame, as well as to a glasses rim and a glasses temple for such a glasses frame.

BACKGROUND INFORMATION

Different types of joint mechanisms for glasses frames are known. The most common type is based on a hinge mechanism in which pins are disposed on the frame or respectively the rim of the lenses, which cooperate with a respective hinge disposed at the end on the side of the temple which is on the side of the rim by interleaving both parts and by connecting them by means of special screws such that they are pivotable. In most glasses rims, in particular in those which are used with corrective glasses, opening and closing the rims for inserting or for changing the lenses is carried out by means of a so-called closing block. The lenses can also be directly attached to a frame by screwing screws directly into the lens. In glasses without a frame, the temples are directly screwed with the lenses by means of a projecting part.

Since the swivel joint is subject to high dynamic loads during lifetime of the glasses, in several solutions, no traditional swivel joint is used for reasons of simplification.

Thus, the U.S. Pat. No. 3,155,982 proposes glasses in which the temples directly cooperate with the front part of the rim which contains the lenses. Therefore, the end of the temple which is on the side of the rim is divided into three leaf springs, wherein the central leaf spring abuts on the external edge of the rim part, whereas the two external leaf springs engage with openings disposed near the external edge in the central piece by means of hooks formed at their ends. A disadvantage of the joint mechanism described in U.S. Pat. No. 3,155,982 is the fact that the glasses temples are only attached to the rim very loosely such that the glasses temples can be loosened from the holder very easily, e. g. when the glasses fall on the floor.

Another solution for a glasses joint which as well uses a glasses temple which is provided with three leaf springs is proposed in the European Patent No. 0 863 424 B1 of Haffmans and Gottschling. On the rim, respectively one connecting element is provided on the left and on the right, which has an upper and a lower recess which forms a joint axis which is perpendicular to the direction of the temple in its folded-up state. In the folded-up state of the temples, the two external leaf springs of the temples engage with the recesses in the connecting element from the surface of the connecting element which is faced to the face of the wearer of the glasses by means of curved shapes which are provided on their free ends and then abut on the surface of the connecting element which is not faced to the face of the wearer of the glasses, whereas the central leaf spring abuts with its entire length on the opposite surface of the connecting element. The connecting element therein is divided in two pieces; thus, it is easily possible to change the lenses. For stabilization, a closing clip can be used which can be pushed over the two-piece connecting element. This mechanism however has the disadvantage that inserting the temples is difficult since the external leaf springs and the central leaf spring have to be guided on opposite surfaces of the connecting element, wherein this operation has to be effected by moving against the resilience and the curved shapes of the ends are disturbing. Furthermore, in particular if the dimensions of this joint are very small, there is a risk that the temples are detached from the connecting element even in the case of low mechanical load.

From the French publication FR 2 779 241, a glasses frame having a glasses joint is known which is achieved by providing with pins the end of the temple on the side of the rim, which engage with recesses of a connecting element on the rim, wherein clips of the connecting element overlap the end on the side of the rim when the temple is swivelled. Such a joint however does not assure a safe holding of the temple in the case of excessive mechanical load.

A joint mechanism is described in WO 98/148313 in which two fingers, one mounted on each of the joint-side ends of the glasses temple, are arched away from one another and the curved ends engage rotatably in apertures which are arranged on a connecting element on the frame side. The curved ends of the fingers are held secure in these apertures in that these fingers exert a certain spring resilience upward and downward. Such a joint mechanism, however, is not associated with flat metal glasses like those for instance in EP 0 863 424 B1.

SUMMARY

On this basis, one object of the present invention is to produce a glasses frame that allows easy installation of the temples and in which it becomes difficult for the glasses temples to come loose independently from mechanical pressure on the glasses, in particular with flat metal glasses.

Consequently, the temples of the glasses frame on their ends toward the rim side have at least two fingers in their longitudinal direction that are configured so that they exert a spring effect essentially in the direction of the joint axis of a rotary joint formed by joint elements of the connecting element of the rim and by cooperating joint elements of the glasses temple. These fingers hold the joint elements of the temples and of the connecting element in a rotatable and secure connection. These fingers at the same time are configured as leaf springs whose leaf surface, when the temple is unfolded, runs essentially in the plane of the connecting element belonging to the temple, which connecting element is also nearly leaf-shaped.

In one embodiment of the glasses frame, the fingers are configured so that the spring force exerted by at least one finger is effective in the direction onto the other finger.

Such a construction is used especially in an advantageous design of the glasses frame in which the connecting element is divided throughout its length into an upper bar and a lower bar. The division of the connecting element extends through the rim all the way to the glasses lenses. This makes replacement of the glasses lenses easy because with the temples removed the sides of the rim can easily be arched apart making the lenses accessible.

With the temples mounted, the spring force of the fingers, finally, makes it possible for the bars to be tensed against one another and the glasses lenses are fixed securely in the corresponding section of the rim.

In this design the temples have joint elements on the fingers in the shape of loops, while corresponding pivot pins are provided on the connecting elements. The loops extend substantially perpendicular to the plane or surface of the temple. With the temple mounted, consequently, the pivot pins of the connecting element grip in the loops of the fingers, so that the spring effect of the fingers holds the loops constantly rotatable on the pivot pins.

In another embodiment the pivot pins of the connecting element are so configured that they are rotatably inserted in corresponding concave bearing bushes or shells of the fingers, which bushes are situated opposite to one another, and also in this case the spring resilience of the fingers is secured, so that the bearing bushes are constantly held in a rotatable contact by means of the pivot pin of the connecting element.

In a simple manner the fingers can be drawn apart contrary to their spring action in order to release the temples from the connecting element and to make the rim accessible for replacement of glasses lenses.

In another embodiment of the glasses frame, the fingers are constructed in such manner that the spring force exerted by at least one finger acts in reverse direction, that is in the direction away from the other finger.

In corresponding manner, then, loops are provided on the connecting element into which pivot pins engage which protrude upward and downward from the fingers. The openings of the loops are extending substantially perpendicular to the plane or surface of the connecting elements. The spring resilience prevents any release of the pivot pin from the loops while forming a simple rotary joint. To dismantle the temples, it is sufficient simply to press the fingers of the temple together against their spring power.

In addition to the fingers configured as leaf springs, in another embodiment, a third, central leaf spring is provided between these two, with all leaf springs running parallel to one another.

The temple can be stamped out from a flat brute together with the leaf springs and the loops in one step in a simple manner. Subsequently, the loops can be bent so that they extend substantially perpendicular to the plane of the temple.

While the outermost of the three leaf springs form the joint elements—depending on the embodiment the loops or the pivot pins—the center leaf spring serves to form a reverse spring mechanism, which supports the unfolding or folding of the temple.

For this purpose the center leaf spring supports itself on a section of the connecting element which extends in the direction towards the temple and thus forms an abutment.

According to one embodiment of the invention, it is thus ensured that the length of the leaf spring and the length of the abutment are selected in such a way that the spring resilience on the one hand is sufficient to achieve a secure connection of the joint elements of the temple and connecting element and on the other hand the leaf spring resilience of the center leaf spring of the temple is sufficient to hold the temple in an unfolded position. In addition, in the embodiment with two bars of the connecting element, the lengths of the respective components are selected in such a way that in addition the spring resilience is sufficient to achieve the secure joining of both bars of the connecting element.

If the leaf-shaped abutment in one embodiment of the glasses frame extends from the joint elements of the connecting element in the direction towards the temple, it is thus configured so that the outer leaf springs can run outward over the abutment during folding.

To achieve additional stability, according to one embodiment of the invention, it is also possible to provide a sleeve which can be slid up before the temple is moved forward by means of the connecting element belonging to the temple and thus secures the bars together rigid against bending.

All components of the inventive glasses frame can be produced in a preferred embodiment as punching parts or sectional parts made of sheet metal, which are then bent into the desired enclosing shape. It is also possible to employ titanium as a material for the individual elements.

Embodiments of the invention will now be more closely described with reference to the embodiments shown in the adjacent illustrations.

BRIEF DESCRIPTION OF THE DRAWINGS

These and other features and advantages will be better understood by reading the following detailed description, taken together with the drawings wherein:

FIG. 3 shows a perspective explosion view of half of a glasses frame according to one embodiment of the invention;

FIG. 4a shows a schematic view of a temple and a rim of the inventive glasses frame with the temple in unfolded position;

FIG. 4b shows a schematic view of the temple and the rim of the inventive glasses frame with the temple in folded position; and FIG. 5 shows a connecting element with alternative joint elements.

DETAILED DESCRIPTION

Figure 1:
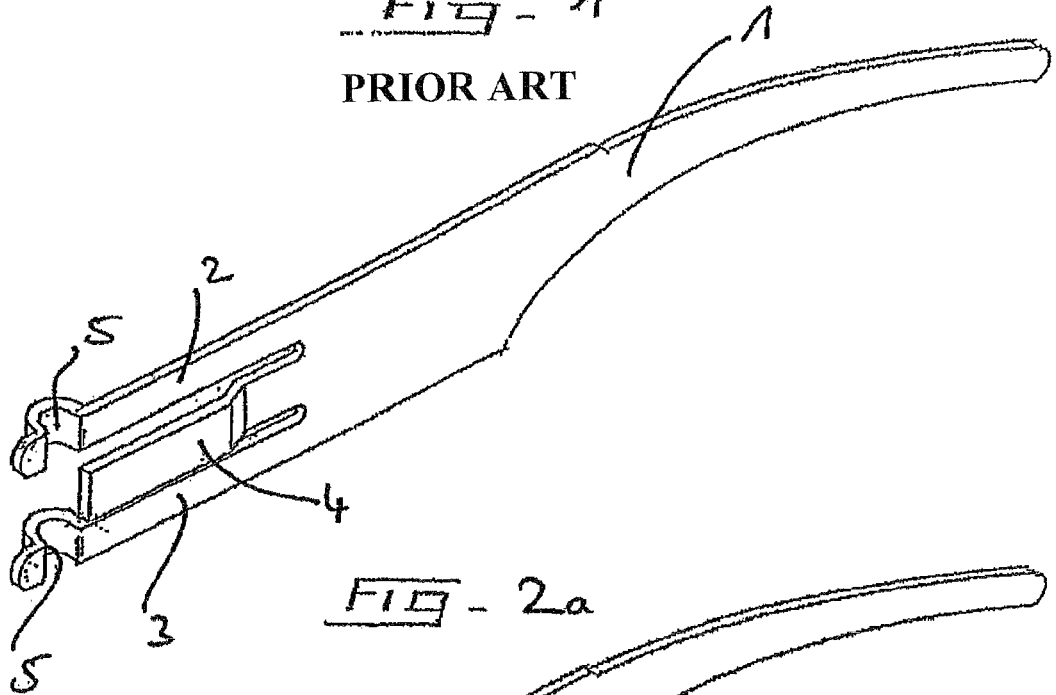
FIG. 1 shows a perspective view of a temple for a glasses frame according to the state of the art.

In FIG. 1, in exemplary fashion, a temple 1 according to the state of the art is shown such as the one described in EP 0 863 424 B1. The temple 1 is divided into three leaf springs 2, 3, and 4 including two outer leaf springs 2 and 3 and a center leaf spring 4. The outer leaf springs 2 and 3 have on their ends curvatures 5, which engage in corresponding recesses (not further illustrated here) of a connecting element of a rim. As previously mentioned, here the center leaf spring 4 and the outer leaf springs 2 and 3 lie on opposite sides of the connecting element of the glasses frame, which prevents easy riming of the temple.

Figure 2A:
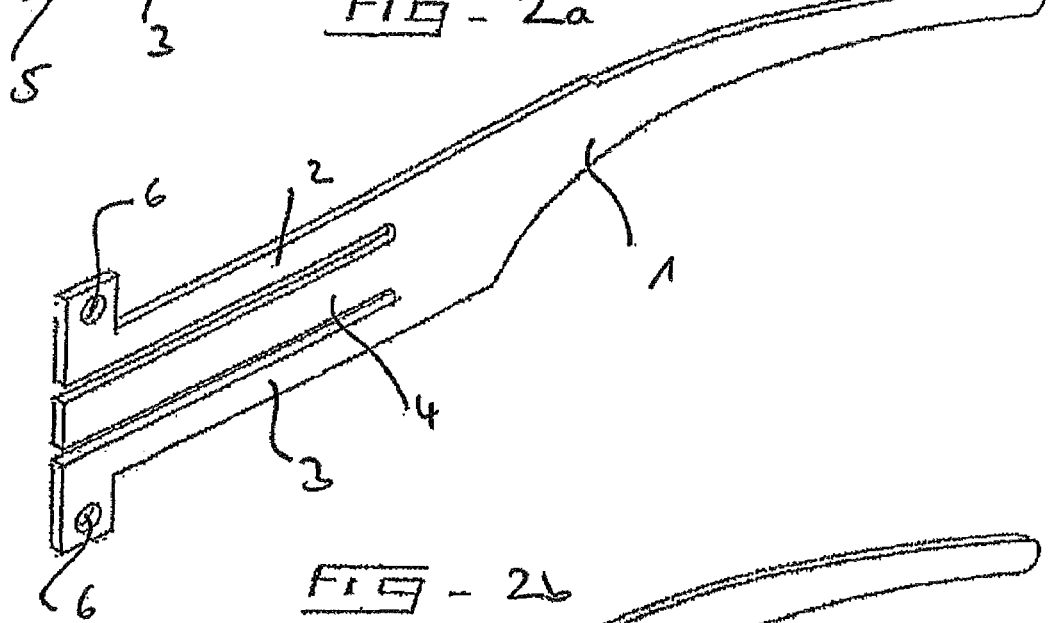
FIG. 2a shows a perspective view of a non-shaped temple for a glasses frame according to one embodiment of the invention, with loops shaped to fit.
Figure 2B:
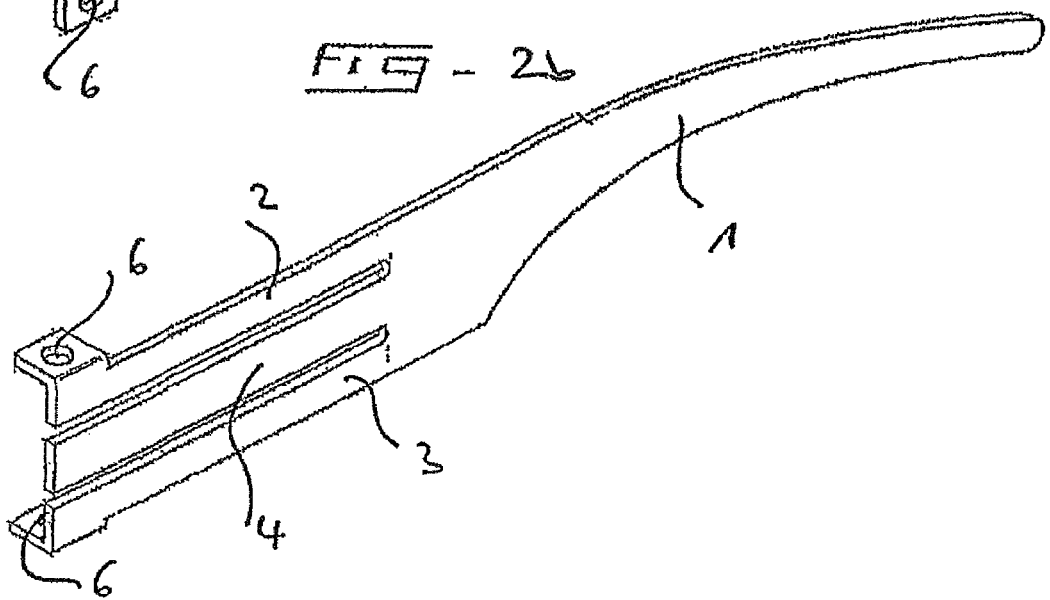
FIG. 2b shows a perspective view of the shaped temple for a glasses frame according to one embodiment of the invention with angled loops.

FIGS. 2a and 2b are schematic depictions of a temple 1 for a glasses frame according to one embodiment of the invention.

The temple 1 also has two outer leaf springs 2 and 3 as well as a center leaf spring 4. The outer leaf springs 2 and 3 each have a loop 6 on their ends.

FIG. 2a shows in this connection the shape of the temple 1 as a punched sheet metal part, while in FIG. 2b the loops 6 are arched perpendicular to the longitudinal direction of the temple 1 in order to define the axis of a rotary joint.

The glasses temple illustrated in FIG. 2b, in comparison to the glasses temple shown in FIG. 1, has longer slits to divide the leaf springs in order to make it easier to pull apart the two outer leaf springs perpendicular to the longitudinal direction of the temple, as more closely explained below.

FIG. 3 shows the temple separated from a rim 7.

The rim 7 on both sides has a connecting element 8, which in comparison to the length of the temple is relatively short, extends in the direction toward the temple 1, and is divided into an upper bar 9 and a lower bar 10.

As can be seen in FIG. 3, the division of the connecting element extends into the front part of the rim 7 as far as the glasses lenses that are not illustrated here. If the temple 1 is removed, the rim 7 can be easily opened laterally in that the bars 9 and 10 are arched away from one another in order to insert or replace the glasses lenses.

On the bars 9 and 10 of the connecting element 8, pivot pins 11 are positioned, overlapping one another while forming a rotation axis, which pins engage in the loops 6 of the outer leaf springs 2 and 3 of the temple 1 in the installed position, as is shown in FIGS. 4a and 4b, and thus form a simple rotary joint.

As can be seen from FIG. 3, the temple 1 in simple manner is secured on the connecting element 8 by having the outer leaf springs 2 and 3 pulled apart and slid over the pivot pin 11. The spring action of the outer leaf springs 2 and 3 toward one another causes the loops 6 to snap securely yet rotatably over the pivot pin 11, in addition causing the upper bar 9 and the lower bar 10 to be secured together rigidly against bending.

The connecting element 8 has a leaf-shaped abutment, which extends from the pivot pin 11 in the direction toward the temple 1.

Figure 3A:
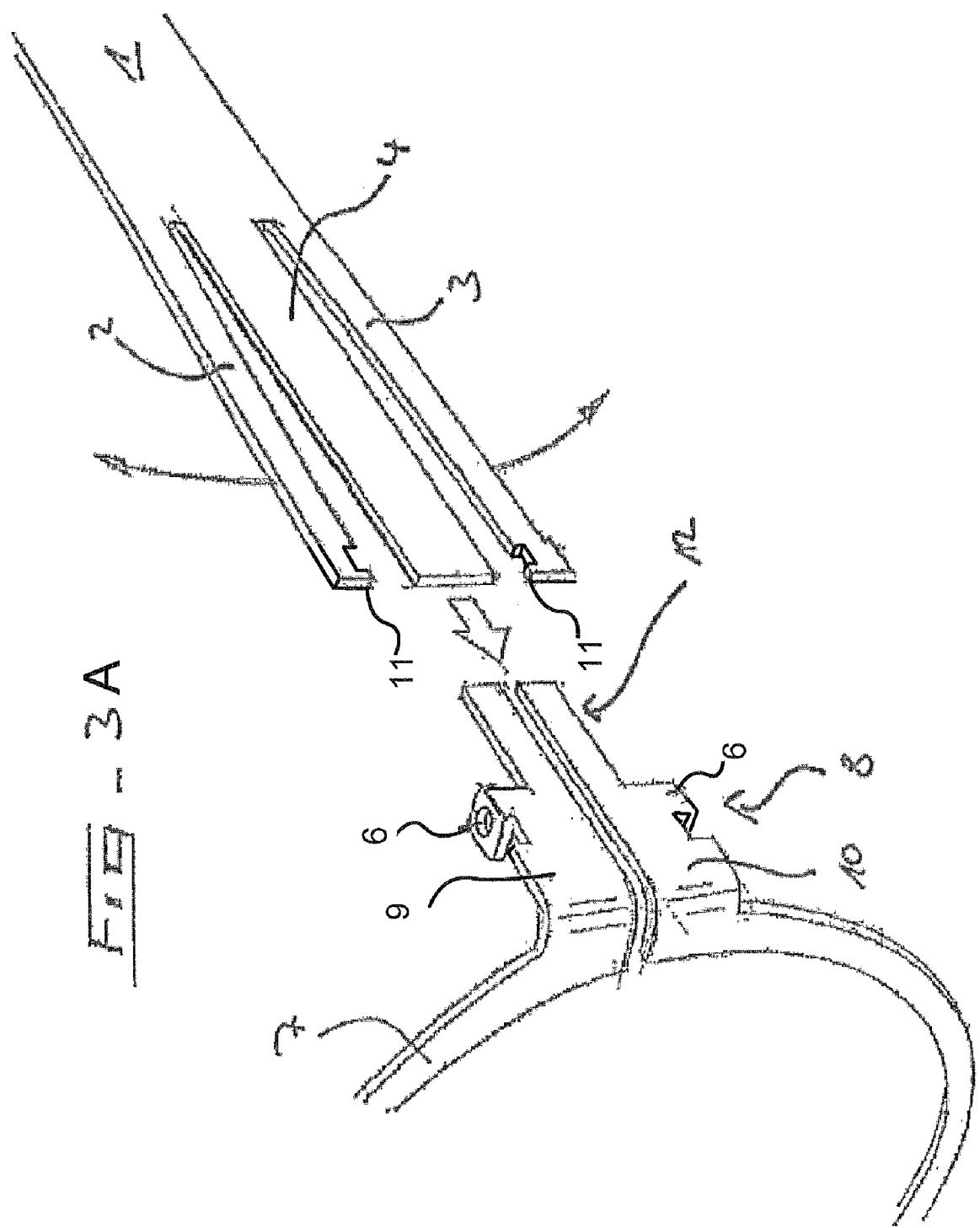
FIG. 3a shows a perspective exploded view of half of a glasses frame according to another embodiment of the invention.

In another embodiment shown in FIG. 3a, the connecting elements 8 may include joint elements formed as loops 6 on the upper and lower portions 9, 10, which cooperate with pins 11 disposed on at least one of the upper leaf spring 2 of the temple 1 and the lower leaf spring 3 of the temple 1 to form a swivel joint.

As can be seen in FIG. 4a, the center leaf spring 4, in unfolded position, comes into contact with the surface of the abutment 12 turned away from the glasses wearer. Upon folding, as shown in FIG. 4b, the center leaf spring 4 is supported on the abutment 12 in order to form a reverse spring mechanism. The abutment 12 is shaped here in such a way that the outer leaf springs 2 and 3 can run unimpeded over the abutment 12 when the temple 1 is folded.

In FIG. 5, in schematic form, is shown an alternative embodiment of the connecting element 8. It shows sphere-like pivot pins 13, which can be received rotatably in bearing bushes (not more closely illustrated here) of the outer leaf springs.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A glasses frame comprising:
a temple including at least three fingers at a rim end of the temple and extending in a longitudinal direction of the temple, wherein the fingers are leaf springs having flat surfaces; and
a rim including a connecting element on a left side and on a right side, the connecting element having a temple end pointing in a direction of the respective temple in a folded-up state, wherein a central leaf spring of the leaf springs is supported on the connecting element of the rim such that the leaf springs run essentially in a plane of the connecting element in an unfolded state, wherein each connecting element includes joint elements on upper and lower portions, the joint elements having the shape of pins and configured to cooperate with joint elements selected from the group consisting of loops and bearing bushes and disposed on the respective fingers of the temple to form a swivel joint with the pins being substantially aligned with an articulation axis of the swivel joint.

2. A glasses temple including a rim end having a material having a flat surface and at least three fingers extending in a longitudinal direction, two of the fingers including a respective joint element selected from the group consisting of a loop and a bearing bush, the joint elements being configured to cooperate with pins on a connecting element of a rim to form a swivel joint such that the pins and the joint element are substantially aligned with an articulation axis of the swivel joint, wherein the fingers are leaf springs having flat surfaces.

3. A glasses rim for receiving lenses, the glasses rim comprising connecting elements on left and right sides, respectively, the connecting elements having a flat surface and pointing in a direction of a respective temple in a folded-up state, wherein each of the connecting elements includes joint elements in the form of pins on upper and lower portions of the connecting elements, wherein each of the connecting elements includes an abutment for a central leaf spring of a temple having three leaf springs, and wherein each of the connecting elements is divided in an upper bar and a lower bar.

4. A glasses frame comprising:
temples on left and right sides, respectively, each of the temples being divided on a rim end in three leaf springs having flat surfaces, the leaf springs including an upper leaf spring, a lower leaf spring, and a central leaf spring; and
a rim including connecting elements on the left and right sides, respectively, each of the connecting elements having a flat surface and a temple end pointing in a direction of a respective one of the temples in a folded-up state, wherein the flat surfaces of the leaf springs are configured to engage the flat surfaces of the connecting elements such that the leaf springs run essentially in a plane of the connecting elements in an unfolded state, wherein each of the connecting elements includes joint elements formed as loops on upper and lower portions, wherein the joint elements cooperate with pins disposed on at least one of the upper leaf spring of the temple and the lower leaf spring of the temple, respectively, to form a swivel joint with the pins being substantially aligned with an articulation axis of the swivel joint, wherein each of the connecting elements has an abutment on which the central leaf spring is supported.

5. The glasses frame according to claim 4 wherein the leaf springs of the temples are made of sheet metal.

6. A glasses frame comprising:
temples on left and right sides, respectively; and
a rim including connecting elements on the left and right sides, respectively, each of the connecting elements having a flat surface and a temple end pointing in a direction of a respective one of the temples in a folded-up state, wherein each of the connecting elements includes joint elements, which cooperate with joint elements disposed on the end of the temple on the side of the rim forming a swivel joint, and wherein the temple is divided on a rim end in a longitudinal direction in three leaf springs having flat surfaces and a leaf surface substantially coplanar with the connecting element of the rim in the unfolded state of the temple, wherein the leaf springs are located on one side of the connecting element of the rim in the unfolded state of the temple, wherein external leaf springs of the temple substantially have a first resilience in direction of the joint axis of the swivel joint, which holds the joint elements of the temple and of the connecting element in a pivotable connection in a captivated manner, wherein the central leaf spring is configured to be supported on the connecting element, and wherein the three leaf springs of the temple are configured to apply a second resilience which is directed perpendicular to the first resilience and which is sufficient for holding the temple in the folded-up state.

7. The glasses frame according to claim 6, wherein the first resilience acts from at least one of the external leaf springs of the temple in direction to the other of the external leaf springs of the temple.

8. The glasses frame according to claim 6, wherein the first resilience spreads both of the external leaf springs away from each other.

9. The glasses frame according to claim 7 wherein the joint elements of the temples include joint elements selected from the group consisting of loops and bearing bushes disposed on the external leaf springs of the temple and the joint elements of the connecting element include pins.

10. Glasses comprising lenses and a glasses frame according to claim 9, wherein the connecting element is divided in an upper bar and a lower bar over its entire length, wherein the division of the connecting element extends through the rim to the lenses which are received by the rim and wherein the glasses frame is designed such that the first resilience is sufficient for tensioning the two bars against one another such that the lenses are fixed in the respective sections of the rim.

11. The glasses according to claim 10 wherein the connection element provides an abutment on which the central leaf spring of the temple is supported, wherein the length of the leaf springs of the temple and the length of the abutment are selected such that the first resilience is sufficient for holding the two bars of the connecting element together and the second resilience is sufficient for holding the temple in the folded-up state.

12. The glasses according to claim 10 wherein the temples and rim are made of sheet metal.

\* \* \* \* \*